United States Patent Office 3,074,913
Patented Jan. 22, 1963

3,074,913
MANUFACTURE OF FILAMENT AND FILM-FORMING POLYESTERS
Trevor Davies, Norman Fletcher, and James Eric McIntyre, Harrogate, England, assignors to Imperial Chemical Industries Limited, London, England, a corporation of Great Britain
No Drawing. Filed Jan. 27, 1961, Ser. No. 85,205
Claims priority, application Great Britain Feb. 11, 1960
8 Claims. (Cl. 260—75)

This invention relates to an improved method for the manufacture of filament and film-forming polyesters, more particularly to an improved polycondensation catalyst for use in the manufacture of highly polymeric polymethylene terephthalates.

In the present day commercial manufacture of highly polymeric polymethylene terephthalates it is common practice to use as the starting materials a dialkyl terephthalate and a glycol, for example, dimethyl terephthalate and ethylene glycol. However, provided terephthalic acid of a sufficient degree of purity can be obtained, the dimethyl terephthalate can be replaced by terephthalic acid. The terephthalic acid or the dialkyl ester thereof is subjected to esterification or ester-interchange with the glycol, preferably in the presence of a suitable catalyst and if desired under superatmospheric pressure conditions. The bis-hydroxyalkyl terephthalate thus formed is polycondensed, desirably under reduced pressure and preferably in the presence of a polycondensation catalyst until a filament and film-forming highly polymeric polymethylene terephthalate is obtained.

There have been described in the prior art many substances as being suitable for polycondensation catalysts in the manufacture of highly polymeric polymethylene terephthalates. Among these are germanium and germanium dioxide which are claimed in United States specification 2,578,660.

In this specification it is stated that "the germanium containing material is advantageously added to the reaction mixture of glycol and acid or ester after the otherwise catalysed alcoholysis reaction has been completed and before the temperature is brought up to the degree necessary to effect polymerisation." Why this stage of addition was considered advantageous is not disclosed in the specification, in fact we have found that when germanium dioxide is added at the beginning of ester-interchange it is not entirely in solution at the end of ester-interchange.

We have now found that if a germanium compound, preferably an alkoxide of germanium, is used which is soluble in the bis-hydroxyalkyl terephthalates, a rapid rate of polycondensation takes place producing polyesters of high intrinsic viscosity which are remarkably free from colour being superior in this respect to those obtained using germanium dioxide.

We have found that if germanium dioxide is used as catalyst, whether added before or after ester-interchange, the polyester thus produced incorporating no delustrant, is hazy, indicating that even at the end of polycondensation, the germanium dioxide is not completely dissolved. A similar polyester made using a compound of germanium, soluble in bis-hydroxyalkyl terephthalates, such as germanium tetraethoxide, is not hazy but is quite clear.

According to the present invention we provide an improved process for the manufacture of fibre and film-forming highly polymeric polymethylene terephthalates which comprises the step of polycondensing a bis(hydroxyalkyl) terephthalate characterised by using as a catalyst for the polycondensation reaction a compound of germanium which is readily soluble in or which readily forms a solution in glycol which is miscible with the polycondensation reaction mixture.

We prefer to use the alkoxides of germanium, especially the ethoxide. However, any compounds of germanium which are readily soluble in the polycondensation reaction mixture or which readily form solutions in glycol which are miscible with this mixture, for example germanium tetrachloride in glycol, provide advantages over the prior disclosed germanium and germanium dioxide for use as polycondensation catalysts in the manufacture of the highly polymeric polymethylene terephthalates.

The germanium compounds of our invention may be used in conjunction with any suitable ester-interchange catalyst. We prefer that these germanium compounds be used in conjunction with an alkaline-earth metal compound such as of calcium or magnesium, for example calcium acetate or magnesium carbonate, in which case it is preferred that the ester-interchange catalyst is inactivated, wholly or in part, prior to the polycondensation taking place, preferably by the addition of a phosphorus compound, such as triphenyl phosphite or phosphorous acid. However, the germanium compounds of our invention may readily be used with other ester-interchange catalysts such as compounds of cobalt, manganese or zinc.

The following Examples 1 and 2 in which all parts and percentages are by weight, illustrate but do not limit the scope of our invention and are shown in comparison with Examples A and B which are illustrative of the prior art.

In each of the following examples, 1552 parts of dimethyl terephthalate were heated in a glass vessel with 1241 parts ethylene glycol in the presence of calcium acetate as ester-interchange catalyst using the concentrations tabulated based on weight of DMT used at 150–210° C. until the theoretical amount of methanol for complete ester-interchange had been evolved. Phosphorous acid was then added and in the concentrations tabulated, to the ester-interchange product of each example, in order to inactivate catalytically the metal of the ester-interchange catalyst. The germanium compound catalysts were then added of the type and in the concentrations (again based on weight of DMT used) as indicated below together with in each case a fine slurry of titanium dioxide (0.5 based on weight of dimethyl terephthalate used) in glycol. The contents of the glass vessel were then transferred to an agitated stainless steel autoclave and the pressure was reduced and the temperature raised until a pressure of 0.2 mm. of mercury and a temperature of 285° C. had been attained.

| Example | Calcium Acetate, Percent | Phosphorous Acid, Percent | Germanium Compound | | Polycondensation Cycle (mins.) | Intrinsic Viscosity | Polyester Colours | | |
|---|---|---|---|---|---|---|---|---|---|
| | | | Nature | Percent | | | L | Y | L–Y |
| A | 0.03 | 0.0154 | Dioxide | 0.01 | 150 | 0.676 | 75 | 13 | 62 |
| 1 | 0.03 | 0.0154 | Tetraethoxide | 0.024 | 134 | 0.687 | 79 | 7 | 72 |
| B | 0.06 | 0.0308 | Dioxide | 0.02 | 143 | 0.659 | 79 | 12 | 67 |
| 2 | 0.06 | 0.0308 | Tetraethoxide | 0.048 | 117 | 0.722 | 78 | 6 | 72 |

The polycondensation cycle time as disclosed in the above table is, in each example, the time from when full vacuum was reached until the agitator was stopped.

Comparison of the colours of the final polyesters obtained in the examples was determined by comparing the yellowness and luminance of samples by measuring the reflectance of the polyesters in the form of a ribbon on a "Colormaster" which is the trade name for the differential colorimeter manufactured by the Manufacturers Engineering and Equipment Corporation.

Luminance (Y on the C.I.E. System) is a measure of the proportion of the incident light reflected and yellowness is a measure, based on C.I.E. chromaticity co-ordinates, of the separation of the point representing the colour rating of the polymer from the point representing standard illumant "C," positive values being measured in the direction of a dominant wavelength of 580–590 mu and negative values in the direction of a dominant wavelength of 470–490 mu.

Relatively small variations in the luminance and yellowness values of polyesters prepared for filament and film ultimate end uses can be of considerable importance in deciding the value of such polyesters for commercial purposes and it is thus essential, particularly for filament end uses, that such polyesters should have high degrees of luminance together with low degrees of yellowness.

We have found that when the yellowness value is not substantially less than zero and when using a tri- or pentavalent antimony compound or a germanium compound as the polycondensation catalyst, a useful criterion of colour is obtained by subtracting the yellowness value from that of the luminance. The best colour is obtained when the luminance value minus the yellowness value is at a maximum. However, for a comparison of this type to be made it is essential that the polyesters in the examples to be compared are manufactured under identical conditions for example on the same scale and in the same equipment and that the ester-interchange catalyst used is the same.

Examples 1 and 2 illustrate the advantages of using a polycondensation catalyst of our present invention in comparison with using a catalyst, germanium dioxide, as disclosed in United States specification 2,578,660.

In Examples A and B, the concentration of germanium dioxide are respectively equal to and twice as great as the concentration used in United States specification 2,578,660 while the concentrations of germanium in Examples A and 1 and B and 2 are equivalent.

It will thus be seen that in each comparison polyethylene terephthalate with a better colour (i.e. higher L-Y values) and higher intrinsic viscosity is made in a shorter cycle time when a soluble germanium compound, germanium tetraethoxide, is used than when using a germanium catalyst of the prior art, namely germanium dioxide.

The process of our invention has been described and exemplified with particular reference to polyethylene terephthalate, but it is to be understood that the invention includes within its scope other highly polymeric polymethylene terephthalates using other glycols of the series $HO(CH_2)_nOH$, where $n=2$ to 10 inclusive, and those copolyesters containing minor amounts of other acids such as isophthalic sebacic and adipic acids and/or with mixtures of glycols. Furthermore, although the process has been exemplified in the polycondensation of a bis-hydroxyalkyl terephthalate obtained by the ester-interchange of a dialkyl terephthalate with a glycol, the bis-hydroxyalkyl terephthalate used may be obtained by any suitable means such as the direct esterification of terephthalic acid with a glycol.

What we claim is:

1. An improved process for the manufacture of fiber and film-forming highly polymeric polymethylene terephthalates which comprises the step of polycondensing a bis-(hydroxyalkyl) terephalate characterized by using as a catalyst for the polycondensation reaction, a member of the group consisting of compounds of germanium which are readily soluble in the reaction mixture and compounds of germanium which readily form a solution in glycol which is miscible with the polycondensation reaction mixture, said germanium compound being selected from the group consisting of lower alkoxides of germanium and germanium tetrachloride.

2. A process according to claim 1 wherein the highly polymeric polymethylene terephthalate is polyethylene terephthalate.

3. A process according to claim 1 wherein the germanium compound is an alkoxide of germanium.

4. An improved process for the manufacture of fiber and film-forming highly polymeric polymethylene terephthalates which comprises the step of polycondensing a bis-(hydroxyalkyl) terephthalate characterized by using as a catalyst for the polycondensation reaction, the tetraethoxide of germanium.

5. An improved process for the manufacture of fiber and film-forming highly polymeric polymethylene terephthalates which comprises the step of polycondensing a bis-(hydroxyalkyl) terephthalate characterized by using as a catalyst for the polycondensation reaction, a solution of germanium tetrachloride in glycol.

6. A process according to claim 1 for manufacturing fibre and film-forming highly polymeric polymethylene terephthalates starting from a glycol and a dialkyl ester of terephthalic acid, wherein an ester-interchange catalyst is used as well as said member of the group consisting of compounds of germanium which are readily soluble in the reaction mixture and compounds of germanium which readily form a solution in glycol which is miscible with the polycondensation reaction mixture, the germanium compound being selected from the group consisting of lower alkoxides of germanium and germanium tetrachloride.

7. A process according to claim 6 wherein the ester-interchange catalyst is calcium acetate.

8. A process according to claim 6 wherein the germanium compound is added with the ester-interchange catalyst.

References Cited in the file of this patent

UNITED STATES PATENTS

| | | |
|---|---|---|
| 2,465,319 | Whinfield | Mar. 22, 1949 |
| 2,578,660 | Auspos | Dec. 18, 1951 |
| 2,820,023 | Cavanaugh | Nov. 15, 1954 |
| 2,951,060 | Billica | Aug. 30, 1960 |